(12) United States Patent
Rapipong et al.

(10) Patent No.: US 9,780,871 B2
(45) Date of Patent: Oct. 3, 2017

(54) MONITORED PATCH PANEL SYSTEM

(71) Applicant: Facebook, Inc., Menlo Park, CA (US)

(72) Inventors: Jeff Piman Rapipong, Palo Alto, CA (US); Howard Lee Davidson, San Mateo, CA (US); Vijay Kumar Manyam, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/939,511

(22) Filed: Nov. 12, 2015

(65) Prior Publication Data

US 2017/0141846 A1  May 18, 2017

(51) Int. Cl.
| | |
|---|---|
| *H04B 10/07* | (2013.01) |
| *H04B 10/079* | (2013.01) |
| *G02B 6/38* | (2006.01) |
| *G02B 6/28* | (2006.01) |
| *H04B 10/25* | (2013.01) |

(Continued)

(52) U.S. Cl.
CPC ..... *H04B 10/07955* (2013.01); *G02B 6/2804* (2013.01); *G02B 6/3895* (2013.01); *G02B 6/3897* (2013.01); *H04B 10/2504* (2013.01); *H04B 10/801* (2013.01); *G01J 1/42* (2013.01)

(58) Field of Classification Search
CPC ..... H04B 10/07; G02B 6/2804–6/2861; G02B 6/3895–6/3897
See application file for complete search history.

(56) References Cited

U.S. PATENT DOCUMENTS 5,394,503 A * 2/1995 Dietz, Jr. ............. G02B 6/3895
 385/134
6,915,036 B2 7/2005 Bhalla et al.
(Continued)

FOREIGN PATENT DOCUMENTS

JP  2005-057642  * 3/2007 ............... G02B 6/26
JP  2007057642 A  3/2007

OTHER PUBLICATIONS

U.S. Appl. No. 15/058,948 by Burgess, K., et al., filed Mar. 2, 2016.
(Continued)

*Primary Examiner* — Li Liu
(74) *Attorney, Agent, or Firm* — Perkins Coie LLP

(57) ABSTRACT

A monitored fiber optic patch panel system is disclosed. The system includes a unit controller and at least one patch panel unit. The unit controller includes a computer, a graphic display, and a Universal Serial Bus (USB) hub. The patch panel unit is connected to the USB hub and includes connectors configured to receive a corresponding optical fiber. Optical directional couplers are coupled to a corresponding one of the connectors, and photodiodes are positioned adjacent corresponding optical directional couplers to measure an optical power level conveyed on the corresponding optical fiber. A data acquisition device is connected to the photodiodes to capture data indicative of the optical power levels. A microcontroller is connected to the data acquisition device to store the data captured by the data acquisition device. The computer is configured to receive the stored data from the microcontroller, and to identify to which connectors optical fibers are connected.

17 Claims, 4 Drawing Sheets

(51) Int. Cl.
*H04B 10/80* (2013.01)
*G01J 1/42* (2006.01)

(56) References Cited

U.S. PATENT DOCUMENTS

| | | | | |
|---|---|---|---|---|
| 6,917,763 | B1* | 7/2005 | Au | H04B 10/0771 398/13 |
| 7,272,309 | B1* | 9/2007 | Tamil | H04L 45/62 370/351 |
| 7,517,243 | B2* | 4/2009 | Caveney | H01R 13/641 439/489 |
| 7,526,200 | B2* | 4/2009 | Nakano | H04B 10/506 398/10 |
| 7,542,675 | B1* | 6/2009 | Graves | H04Q 11/0005 398/45 |
| 9,097,874 | B2 | 8/2015 | Coleman et al. | |
| 9,219,543 | B2* | 12/2015 | Smith | H04B 10/07955 |
| 2004/0085621 | A1* | 5/2004 | Sekiya | H01S 3/302 359/334 |
| 2005/0191056 | A1 | 9/2005 | Coffey et al. | |
| 2007/0036506 | A1* | 2/2007 | Kewitsch | G02B 6/4457 385/135 |
| 2007/0043809 | A1 | 2/2007 | Aultman et al. | |
| 2008/0008474 | A1* | 1/2008 | Boduch | H04J 14/0204 398/85 |
| 2008/0138074 | A1* | 6/2008 | Ohtou | H04J 14/0221 398/79 |
| 2009/0073424 | A1 | 3/2009 | Xia et al. | |
| 2009/0290870 | A1* | 11/2009 | Koyano | H04B 10/07955 398/25 |
| 2010/0027953 | A1 | 2/2010 | Russell et al. | |
| 2010/0211664 | A1 | 8/2010 | Raza et al. | |
| 2010/0284687 | A1 | 11/2010 | Tanzi et al. | |
| 2011/0123190 | A1* | 5/2011 | Xia | H04B 10/0731 398/25 |
| 2011/0267794 | A1 | 11/2011 | Anderson et al. | |
| 2012/0321255 | A1* | 12/2012 | Kewitsch | G02B 6/3502 385/78 |
| 2013/0279856 | A1* | 10/2013 | Boduch | G02B 6/4471 385/59 |
| 2015/0308863 | A1* | 10/2015 | Chen | G01D 5/268 385/12 |
| 2015/0309271 | A1 | 10/2015 | Huegerich et al. | |
| 2016/0091685 | A1 | 3/2016 | Raza et al. | |
| 2016/0346058 | A1* | 12/2016 | Bacher | A61B 90/30 |
| 2017/0139165 | A1 | 5/2017 | Burgess | |

OTHER PUBLICATIONS

Non-Final Office Action dated Jun. 30, 2017, for U.S. Appl. No. 15/058,948, of Burgess K., filed Mar. 2, 2016.

* cited by examiner

MONITORED PATCH PANEL SYSTEM

TECHNICAL FIELD

This patent application is directed to data storage server configurations and, more specifically, to a patch panel system.

BACKGROUND

A patch panel is a device that features a number of connectors, usually of the same or similar type, for connecting and routing circuits in a convenient and flexible manner. Patch panels are commonly used in computer networking, and in particular, cases are used with fiber optic cable. As network system infrastructures grow, there can be thousands of patch panel connections in a single system. As patch panels are a manual device, errors in connections can occur that are difficult to troubleshoot and correct. Furthermore, telecommunication bandwidth is often leased based on the number of circuits used. If a circuit has failed or is failing, it is difficult to determine that it has done so, and therefore, the leased bandwidth may be costing a consumer even though the bandwidth is not available. One advantage of traditional patch panels is that they do not rely on electronics or a power source to make and maintain a connection. As long as the connection is physically intact, the patch panel will function. Accordingly, there is a need for patch panel systems that can facilitate troubleshooting and monitoring the interconnected circuits while still remaining a simple fail-safe device.

BRIEF DESCRIPTION OF THE DRAWINGS

Embodiments of the monitored patch panel system introduced herein may be better understood by referring to the following Detailed Description in conjunction with the accompanying drawings, in which like reference numerals indicate identical or functionally similar elements.

Figure 1:
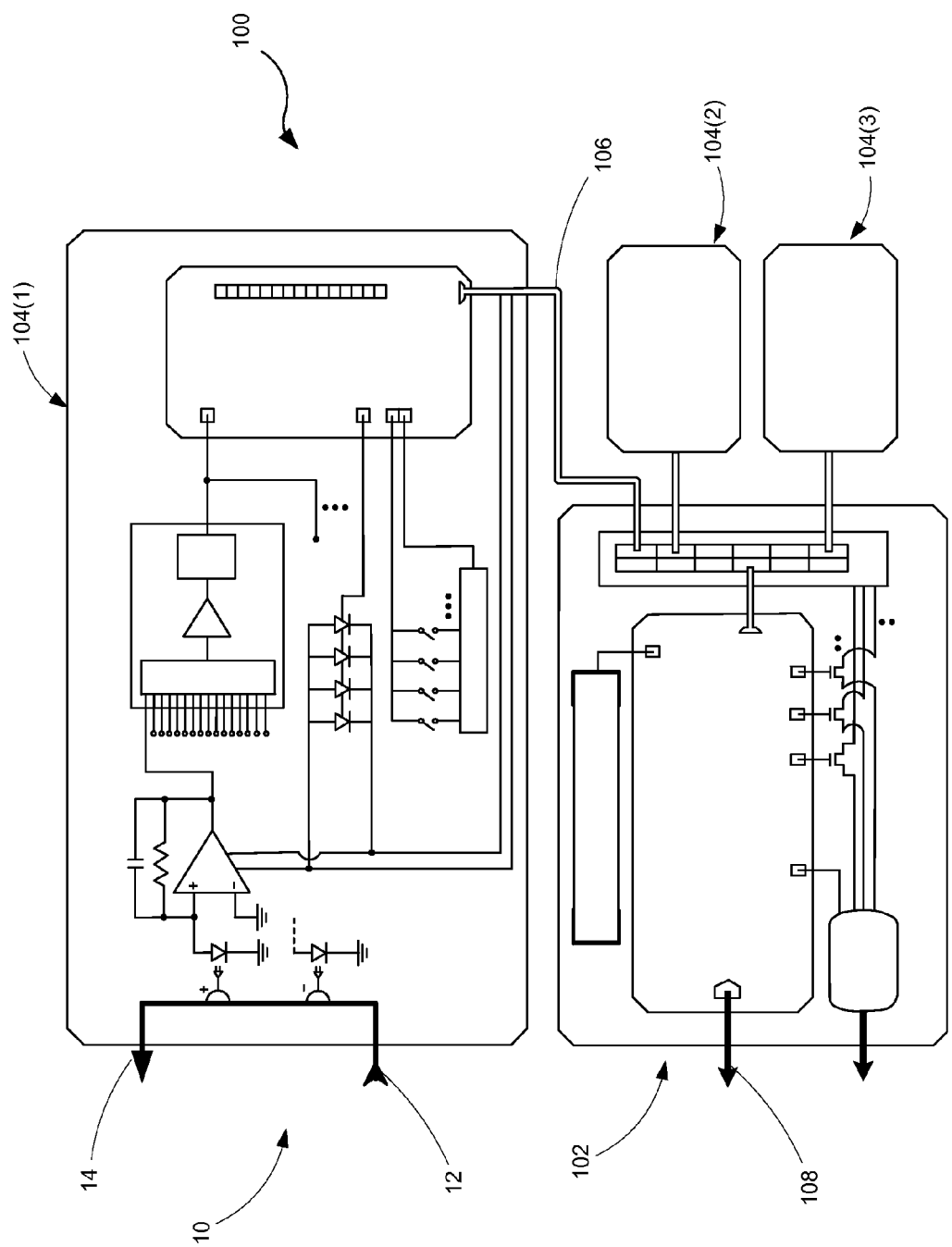
FIG. 1 is a schematic representation of a monitored fiber optic patch panel system according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A monitored fiber optic patch panel system is disclosed. In an embodiment, the system includes a unit controller and at least one patch panel unit. The unit controller includes a computer, a graphic display, and a Universal Serial Bus (USB) hub. The patch panel unit is connected to the USB hub. The patch panel unit includes a plurality of connectors, each configured to receive a corresponding optical fiber, and a plurality of optical directional couplers, each coupled to a corresponding one of the plurality of connectors. A plurality of photodiodes are each positioned proximate to (e.g., adjacent) a corresponding one of the plurality of optical directional couplers and are configured to measure an optical power level conveyed on the corresponding optical fiber. One or more data acquisition devices are connected to the plurality of photodiodes operative to capture data indicative of the optical power levels. A microcontroller is connected to the one or more data acquisition devices and is configured to store the data captured by the one or more data acquisition devices. The computer is configured (e.g., with hardware and/or software) to receive the stored data from the microcontroller.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

As shown in FIG. 1, the monitored fiber optic patch panel system 100 includes a unit controller 102 and a plurality of patch panel units 104, such as patch panel units 104(1), 104(2), and 104(3), connected to the unit controller 102 by serial links 106. In some embodiments, the serial links are USB links. In at least one embodiment, the unit controller 102 controls up to 20 patch panel units 104. In at least one embodiment, each patch panel unit can receive up to 48 fiber optic pairs 10. Each fiber optic pair 10 includes an inbound fiber 12 and an outbound fiber 14. Thus, each patch panel unit can receive up to 96 fibers. As explained more fully below, each patch panel unit can monitor and help diagnose each fiber optic connection. The unit controller 102 provides power to the patch panel units 104 via the USB links 106. The unit controller 102 also receives data regarding the fiber optic pairs via the USB links 106 and can transmit that information to a central monitoring location via an Ethernet connection 108.

Figure 2:
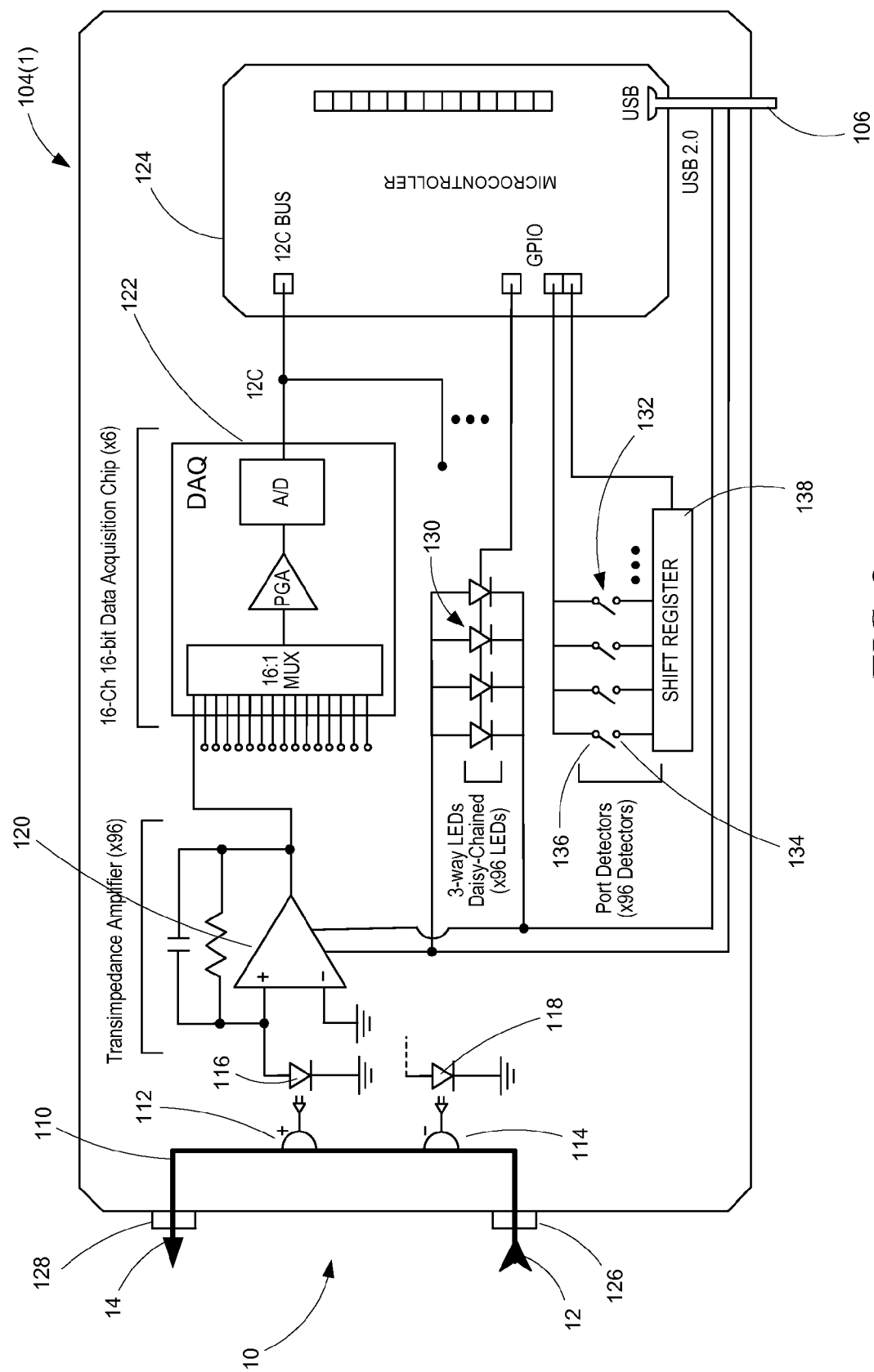
FIG. 2 is a schematic representation of a patch panel unit as shown in FIG. 1.

As shown in FIG. 2, the patch panel unit 104(1) is configured to receive a fiber optic pair 10 for connection and monitoring. Specifically, the patch panel unit 104(1) includes an input connector 126 configured to receive the inbound fiber 12 and an output connector 128 configured to receive the outbound fiber 14. The input connector 126 and the output connector 128 are interconnected with a patch cable 110. The patch cable 110 is connected to a pair of optical directional couplers 112 and 114 configured to measure the power of the fiber optic pair 10.

An optical directional coupler taps and monitors signal intensity through an optical fiber. An optical directional coupler taps approximately one to three percent of the optical fiber's signal power. These optical directional couplers are also directional, thereby only measuring the signal intensity in one direction. Thus, the signal intensity in the inbound fiber 12 and the outbound fiber 14 can be measured separately. For example, optical directional coupler 112 may be configured to monitor the signal intensity of outbound traffic from the outbound fiber 14.

Each optical directional coupler has an associated photodiode positioned adjacent to the optical directional coupler in order to measure the optical power level conveyed on the corresponding optical fiber. For example, optical directional coupler 112 has an associated photodiode 116 to measure the signal intensity on outbound fiber 14. Similarly, the signal intensity on inbound fiber 12 is measured with optical directional coupler 114 and photodiode 118. Each photodiode 116 and 118 is connected to a transimpedance amplifier 120 (only one shown for simplicity) to amplify the photodiode signal. A data acquisition device 122 receives the amplified signal from the transimpedance amplifier 120 and converts that from an analog signal to a digital signal that can be recorded by a microcontroller 124. In some embodiments, the microcontroller 124 can be an off-the-shelf open-source microcontroller such as those available from Arduino.

As mentioned above, each patch panel unit 104 can receive 48 pairs of optical fibers. Accordingly, for each pair of connectors (126, 128), there is a patch cable 110, a pair of optical directional couplers (112, 114), a pair of photodiodes (116, 118), and a pair of corresponding transimpedance amplifiers 120. In some embodiments, the data acquisition device 122 can be a 16-channel device. Accordingly, six data acquisition devices 122 are required for each patch panel unit 104. The microcontroller 124 is configured to capture, store and transmit data for each of the 96 ports to the unit controller 102.

Each connector 126, 128 has a corresponding indicator 130 to indicate a status of the connector and/or optical fiber connected to the connector. For example, the indicator 130 can be a three-way (e.g., tri-color) light emitting diode (LED) that indicates whether a cable is connected to the port and/or if there is sufficient signal power on the optical fiber. In some embodiments, the patch panel unit 104 also includes port detectors 132 to detect the presence of a connected optical fiber. The port switches 132 include phototransistors 134 positioned adjacent corresponding connectors, such as connectors 126 and 128, and corresponding LEDs 136 located opposite the phototransistors 134. If an optical fiber is present, the light emitted from LED 136 is blocked from reaching phototransistor 134 which thereby detects that the cable is present. If a cable is not present, then the light from the LED 136 causes phototransistor 134 to register that a cable is missing. Each phototransistor 134 is connected to a shift register 138 that converts the parallel port switch data to a serial data stream for transmission to the microcontroller 124.

Figure 3:
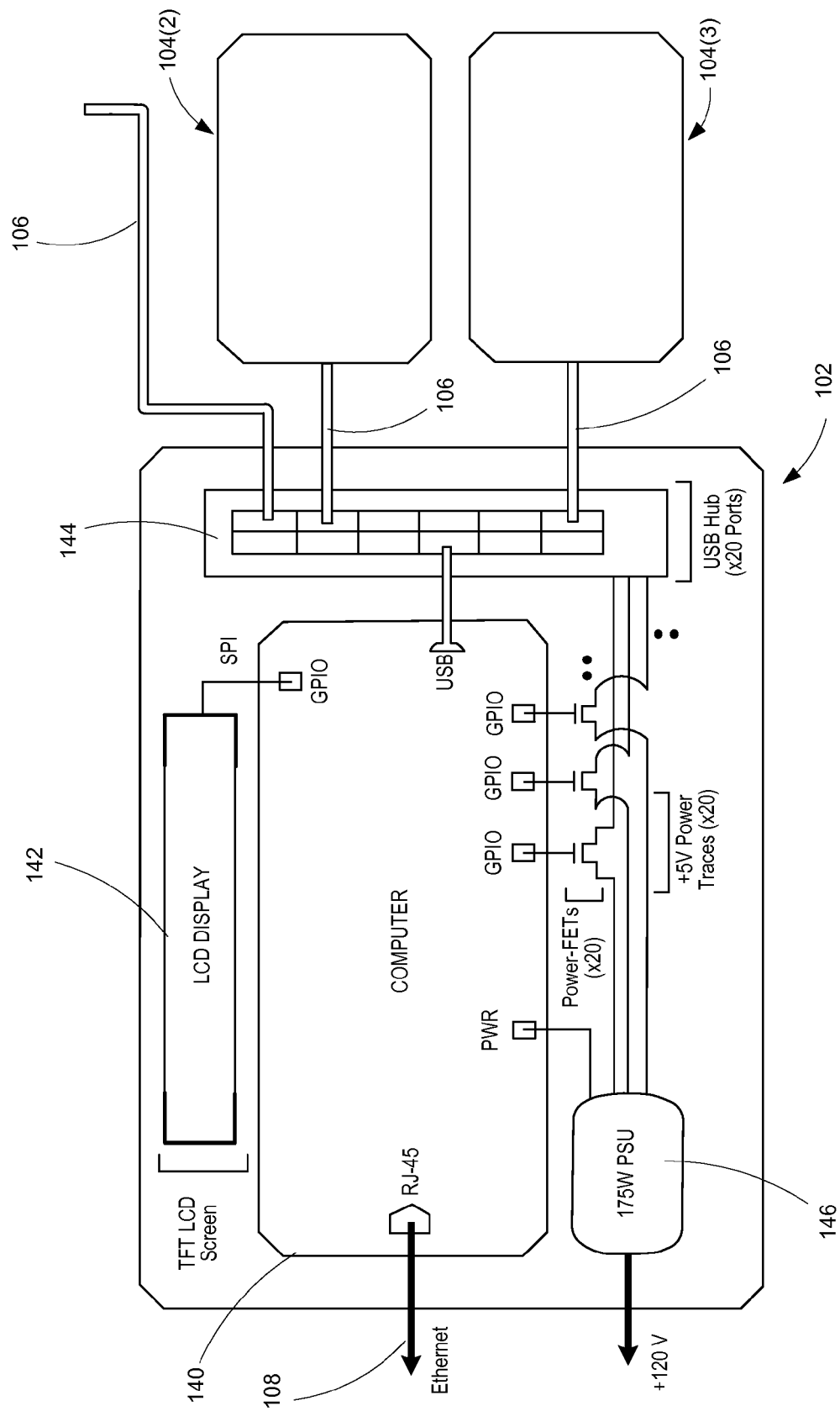
FIG. 3 is a schematic representation of the patch panel unit controller as shown in FIG. 1.

As shown in FIG. 3, the unit controller 102 includes a computer 140 that drives an LCD display 142 to communicate the unit controller status as well as the status of the patch panel units 104. Computer 140 is also connected to a USB hub 144 which, as mentioned above, can include up to 20 ports, each of which can control a separate patch panel unit 104. The computer 140 receives data corresponding to power levels and status indication via the USB links 106 for transmission via Ethernet connection 108. In some embodiments, the unit controller 102 includes a power supply unit 146 that receives power from a 120 volt source, such as a wall outlet or power distribution unit. Power supply unit 146 provides five volt power to the USB hub 144 and also to the computer 140. In at least one representative embodiment, the computer 140 can be an off-the-shelf open-source computer such as those available from the Raspberry Pi Foundation.

In light of the foregoing, it should be appreciated that the monitored fiber optic patch panel system 100 is operative to detect the presence of an optical fiber in a corresponding port with a corresponding port detector 132. Also, each port is equipped with a status indicator LED which, in some embodiments, is a three-way LED that can communicate the status of each port and/or the corresponding optical fiber connected to that port. And finally, the patch panel units can monitor power levels of each fiber optic pair thereby monitoring the connection status of the incoming and outgoing traffic for each pair.

Figure 4:
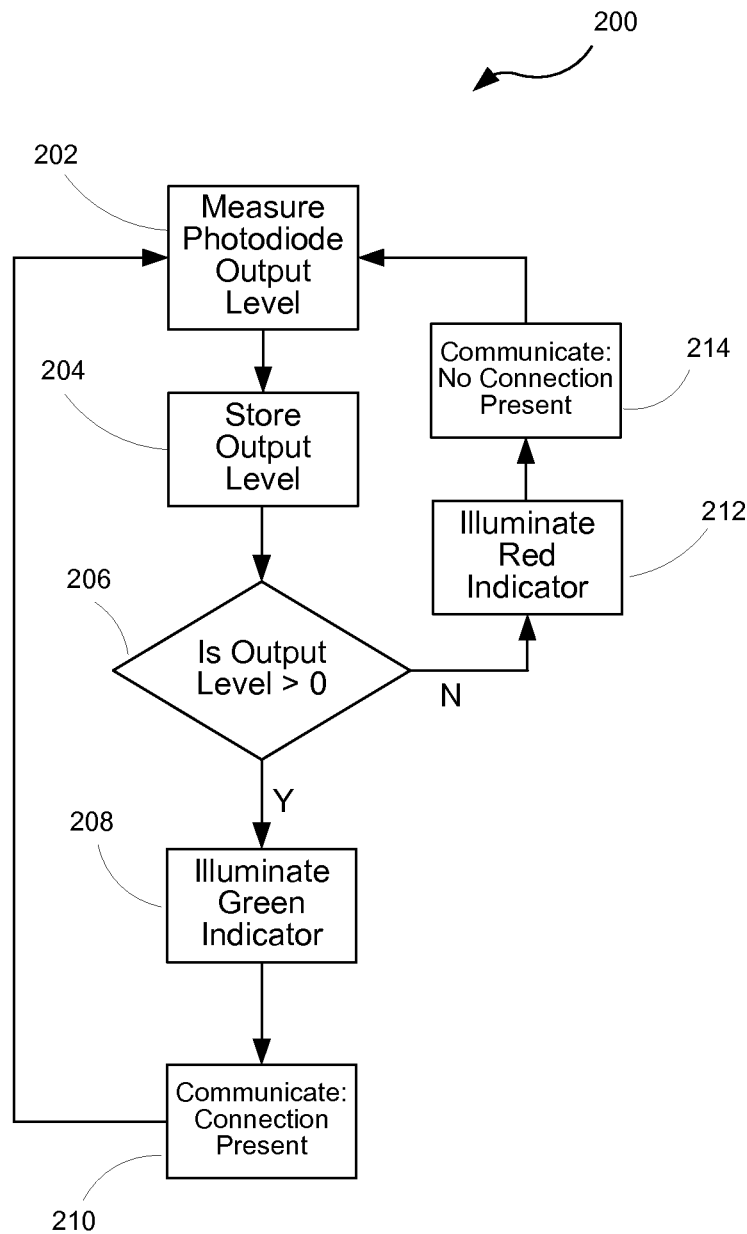
FIG. 4 is flow chart illustrating steps for monitoring a patch panel connector for the presence of an optical fiber according to a representative embodiment.

In some embodiments, the presence of a connected optical fiber can be detected using a corresponding optical directional coupler and its associated photodiode. For example, the flow chart 200, shown in FIG. 4, illustrates steps for monitoring a patch panel connector for the presence of an optical fiber. At step 202, the patch panel can be monitored by measuring, via the photodiode positioned proximate the optical directional coupler, an optical power level conveyed on the optical fiber, wherein the photodiode corresponds to a connector. At step 204, the measured optical power level is stored. In some embodiments, the measured optical power level is stored in a microcontroller. At step 206, whether or not an optical fiber cable is connected to the connector is identified based on the measured optical power level. For example, if the power level is greater than a threshold value (e.g., zero), an optical fiber cable is present, otherwise no cable is present. In other embodiments, ranges may be employed to indicate whether the connection is a good connection, a weak connection, or no connection. At step 208, if an optical fiber cable is present, a status indicator can be illuminated to visually communicate the connection status to a user. For example, a tri-color LED can be activated to illuminate green in order to indicate a connection is present and/or that there is a good connection. At step 210, the connection present status can be communicated via the microcontroller and/or controller via USB and/or Ethernet for remote reporting. At step 212, if an optical fiber cable is not present, the tri-color LED can be activated to illuminate red in order to indicate a connection is not present and/or that there is a weak connection. At step 214, the connection not present status can be communicated for remote reporting.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A monitored fiber optic patch panel unit, comprising:
a connector configured to receive an optical fiber;
a phototransistor positioned adjacent the connector and a light emitting diode located opposite the phototransistor to detect a presence of the optical fiber;
an optical directional coupler coupled to the connector;
a photodiode positioned adjacent the optical directional coupler and configured to measure an optical power level conveyed on the optical fiber;
a data acquisition device connected to the photodiode operative to capture data indicative of the optical power level; and
a microcontroller connected to the data acquisition device and configured to store the data captured by the data acquisition device.

2. The monitored fiber optic patch panel unit of claim 1, further comprising a status indicator corresponding to the connector and operative to indicate a status of the connector.

3. The monitored fiber optic patch panel unit of claim 1, wherein the optical directional coupler is a first optical directional coupler, and further comprising a second optical directional coupler.

4. The monitored fiber optic patch panel unit of claim 3, wherein the photodiode is a first photodiode, and further comprising a second photodiode positioned adjacent the second optical directional coupler.

5. The monitored fiber optic patch panel unit of claim 4, wherein the first optical directional coupler and the first photodiode are configured to measure a first optical power level corresponding to a first signal direction, and wherein the second optical directional coupler and the second photodiode are configured to measure a second optical power level corresponding to a second signal direction.

6. A monitored fiber optic patch panel unit, comprising:
a plurality of connectors, each configured to receive a corresponding optical fiber;
a phototransistor positioned adjacent each of the plurality of connectors and a light emitting diode located opposite each phototransistor to detect a presence of the corresponding optical fiber;
a plurality of optical directional couplers, each coupled to a corresponding one of the plurality of connectors;
a plurality of photodiodes, each positioned proximate to a corresponding one of the plurality of optical directional couplers and configured to measure an optical power level conveyed on the corresponding optical fiber;
one or more data acquisition devices connected to the plurality of photodiodes operative to capture data indicative of the optical power level; and
a microcontroller connected to the one or more data acquisition devices and configured to store the data captured by the one or more data acquisition devices.

7. The monitored fiber optic patch panel unit of claim 6, further comprising a shift register interconnecting the each phototransistor and the microcontroller.

8. The monitored fiber optic patch panel unit of claim 6, wherein the plurality of optical directional couplers are first optical directional couplers, and further comprising a plurality of second optical directional couplers, each coupled to the corresponding one of the plurality of connectors.

9. The monitored fiber optic patch panel unit of claim 8, wherein the plurality of photodiodes are first photodiodes, and further comprising a plurality of second photodiodes positioned adjacent corresponding ones of the plurality of second optical directional couplers.

10. The monitored fiber optic patch panel unit of claim 9, wherein the first optical directional couplers and the first photodiodes are configured to measure first optical power levels corresponding to a first signal direction, and wherein the plurality of second optical directional couplers and the plurality of second photodiodes are configured to measure second optical power levels corresponding to a second signal direction.

11. A monitored fiber optic patch panel system, comprising:
a unit controller, including:
a computer;
a graphic display; and
a Universal Serial Bus hub; and
at least one patch panel unit connected to the Universal Serial Bus hub, the at least one patch panel unit including:
a plurality of connectors, each configured to receive a corresponding optical fiber;
a phototransistor positioned adjacent each of the plurality of connectors and a light emitting diode located opposite each phototransistor to detect a presence of the corresponding optical fiber;
a plurality of optical directional couplers, each coupled to a corresponding one of the plurality of connectors;
a plurality of photodiodes, each positioned adjacent a corresponding one of the plurality of optical directional couplers and configured to measure an optical power level conveyed on the corresponding optical fiber;
one or more data acquisition devices connected to the plurality of photodiodes operative to capture data indicative of the optical power level; and a microcontroller connected to the one or more data acquisition devices and configured to store the data captured by the one or more data acquisition devices;

wherein the computer is configured to receive the stored data from the microcontroller.

12. The monitored fiber optic patch panel system of claim 11, further comprising a shift register interconnecting the each phototransistor and the microcontroller.

13. The monitored fiber optic patch panel system of claim 11, wherein the plurality of optical directional couplers are first optical directional couplers, and further comprising a plurality of second optical directional couplers, each coupled to the corresponding one of the plurality of connectors.

14. The monitored fiber optic patch panel system of claim 13, wherein the plurality of photodiodes are first photodiodes, and further comprising a plurality of second photodiodes positioned adjacent corresponding ones of the plurality of second optical directional couplers.

15. The monitored fiber optic patch panel system of claim 14, wherein the first optical directional couplers and the first photodiodes are configured to measure first optical power levels corresponding to a first signal direction, and wherein the plurality of second optical directional couplers and the plurality of second photodiodes are configured to measure second optical power levels corresponding to a second signal direction.

16. The monitored fiber optic patch panel system of claim 11, further comprising a status indicator corresponding to each of the plurality of connectors and operative to indicate a status of the corresponding one of the plurality of connectors.

17. A method for monitoring a patch panel, comprising:
positioning a light emitting diode adjacent a connector;
positioning a phototransistor opposite the light emitting diode to detect a presence of a corresponding optical fiber;
measuring, via a photodiode positioned proximate to an optical directional coupler, an optical power level conveyed on the optical fiber;
storing the measured optical power level; and
indicating, based on the measured optical power level, a status of the connector.

* * * * *